United States Patent [19]

Le Rat

[11] Patent Number: 4,585,609
[45] Date of Patent: Apr. 29, 1986

[54] METHOD OF MONITORING AN ELECTRICITY GENERATING STATION EQUIPPED WITH A NUCLEAR REACTOR

[75] Inventor: Guy Le Rat, Torcy, France

[73] Assignee: Framatome & Cie, Courbevoie, France

[21] Appl. No.: 449,948

[22] Filed: Dec. 15, 1982

[30] Foreign Application Priority Data

Dec. 31, 1981 [FR] France .................. 81 24594

[51] Int. Cl.⁴ .................................................. G21C 17/00
[52] U.S. Cl. ....................................... 376/245; 376/217
[58] Field of Search ...................... 376/216, 217, 245

[56] References Cited

U.S. PATENT DOCUMENTS

| | | | |
|---|---|---|---|
| 4,007,595 | 2/1977 | Braytenbah et al. | 376/216 |
| 4,187,144 | 2/1980 | Mueller et al. | 376/216 |
| 4,188,792 | 2/1980 | Schaible | 376/216 |
| 4,263,654 | 4/1981 | Fukuzaki et al. | 376/216 |
| 4,292,129 | 9/1981 | Barry | 376/217 |
| 4,318,778 | 3/1982 | Musick | 376/216 |
| 4,333,797 | 6/1982 | Nishizawa | 376/216 |
| 4,421,716 | 12/1983 | Hench et al. | 376/216 |
| 4,459,259 | 6/1984 | Colley | 376/217 |
| 4,470,948 | 9/1984 | Aanstad et al. | 376/216 |

*Primary Examiner*—Salvatore Cangialosi
*Attorney, Agent, or Firm*—Pollock, Vande Sande & Priddy

[57] ABSTRACT

Method of monitoring a nuclear power station by gathering information, called parameters, relating to the operation and state of the power station and its auxiliary equipment, comparing these parameters with reference data corresponding to normal operation, and signaling the differences, in order to permit an operator to evaluate the state of the power station very quickly, and to undertake any needed steps promptly.

4 Claims, 5 Drawing Figures

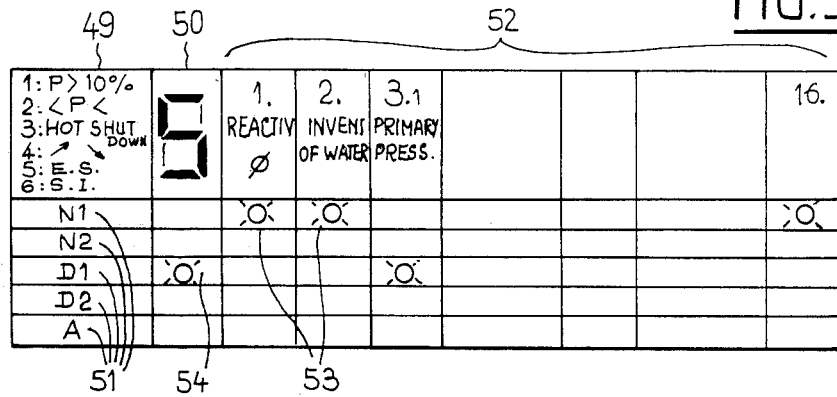
FIG.3
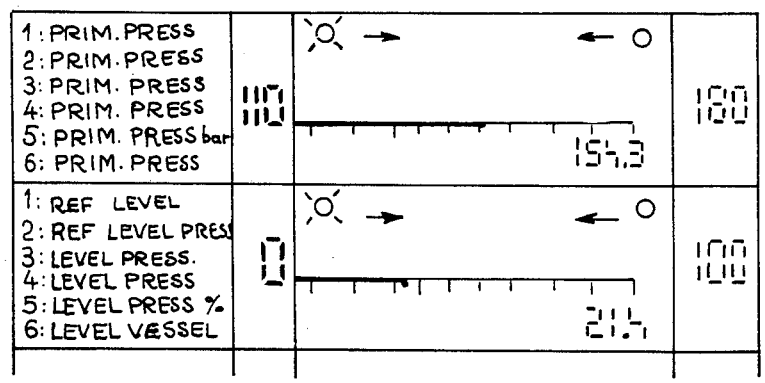
FIG.4
FIG.5

METHOD OF MONITORING AN ELECTRICITY GENERATING STATION EQUIPPED WITH A NUCLEAR REACTOR

FIELD OF THE INVENTION

The invention relates to a method of monitoring an electricity generating station equipped with a nuclear reactor.

BACKGROUND OF THE INVENTION

In such energy generating stations, for example nuclear power stations having a pressurized-water nuclear reactor, quantitative or qualitative information relating to the operation or state of the various components of the power station is gathered continuously. This information, generally called "parameters", is compared with reference data corresponding to normal operation of the power station and, in the event of a significant difference between a parameter and a reference datum, gives rise to a signal or an alarm in the control room of the power station.

These signals or alarms must be taken into account by an operator who must, if appropriate, intervene to prevent a dangerous development in the state of the power station or the occurrence of a malfunction or an accident making it necessary to take appropriate action.

However, such a monitoring system makes the operator's job relatively complex under certain circumstances.

Thus, when a malfunction or an accident occurs in the power station, the operator is faced with a very large number of alarms which it is difficult to act upon in a very short time. This happens, for example, after an emergency shutdown or after a phase of safety injection. It is then very difficult for the operator to distinguish the fault which led to the malfunction causing the emergency shutdown and/or the safety injection.

It has therefore been proposed to adopt a monitoring system in which it was possible by successive interrogations to arrive at the cause of the malfunction by itemizing all the relations of cause and effect between the events occurring in the power station.

Such a process leads to the use of very large memories and complex logics. The time required for the successive interrogations also risks preventing an effective and rapid intervention by the operator. Moreover, it is never possible to be certain of having thought of all the possibilities.

SUMMARY OF THE INVENTION

The purpose of the invention is, therefore, to propose a method of monitoring an electricity generating station equipped with a nuclear reactor, involving gathering quantitative or qualitative information, called "parameters," relating to the operation and state of the components of the power station, comparing these parameters with reference data corresponding to normal operation of the power station, and signalling the differences existing between the parameters and the reference data, and this method must make it possible for the operator to have a very rapid and highly synthetic view of the state of the power station, to evaluate precisely the seriousness and the risks of such a situation and to intervene very rapidly and very effectively.

With this aim in view, in order to put into practise the method according to the invention:

an assembly of predetermined situations is defined, these corresponding to the various phases of operation or shutdown of the reactor depending on the level of the power emitted by the core, the physical parameters of the primary fluid and their variation with time or the needs for action relating to the protection and safeguard of the reactor;

the type of operation of the reactor is defined at each moment by linking it to one of the predetermined situations;

the useful parameters for monitoring the power station are grouped into sub-assemblies called "functions", each corresponding to the parameters and conditions relating to the performance of a particular and indispensable task in the power station;

the state of each of the parameters of each of the functions is determined according to a predetermined category describing its suitability for contributing to performing the function in the situation in question and representing a level of deterioration in relation to normal operation according to predetermined specifications;

the most unfavorable state allocated to at least one of the parameters of each of the functions in question is allocated to this function;

the overall state of the situation in the power station is determined as being the most unfavorable state allocated to at least one of the functions;

the information relating to the overall state of the situation, to the state of each of the functions and to any change in the state of any one of these functions is displayed.

BRIEF DESCRIPTION OF THE DRAWINGS

To make the invention easy to understand, an embodiment of the monitoring method according to the invention will be described by way of example with reference to the attached drawings, in the case of a power station equipped with a pressurized-water nuclear reactor.

FIG. 3 is an enlarged view of the device used to display the state of the situation and of the functions.

FIG. 4 is an enlarged view of the device for displaying the parameters of a function which has undergone a change of state.

FIG. 5 is an enlarged view of the device used to display the state of the main parameters of each of the functions in a particular situation.

DETAILED DESCRIPTION OF THE DRAWINGS

Figure 1:
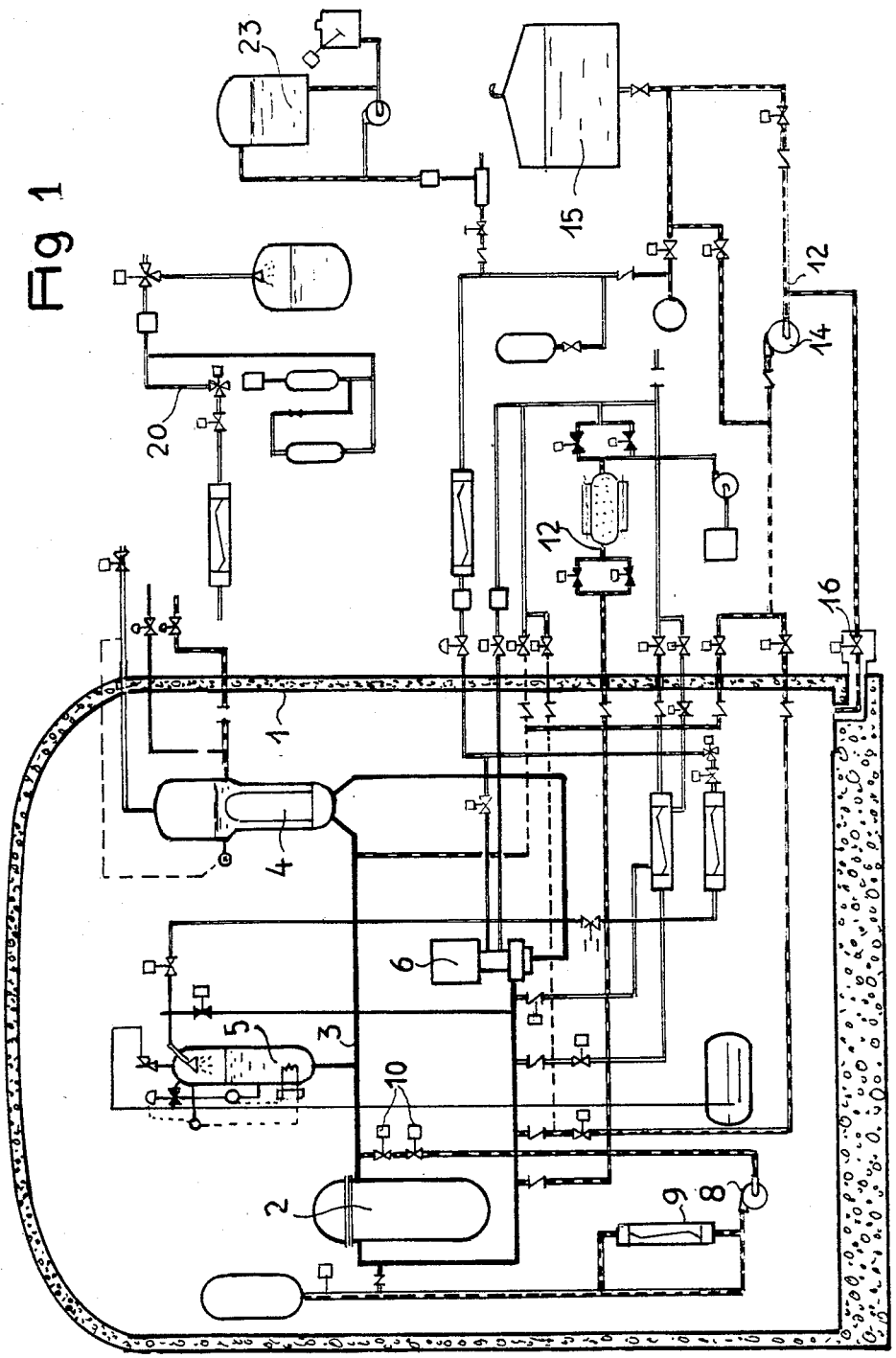
FIG. 1 shows diagrammatically the nuclear reactor and the various circuits necessary for its operation and its safety.

FIG. 1 shows the safety enclosure 1 of a pressurized-water nuclear reactor, comprising a vessel 2 within which the core of the reactor is located, a primary circuit 3, only one loop of which has been shown, a steam generator 4, the pressurizer 5 and a primary pump 6 being arranged on this loop.

The primary circuit of a pressurized-water nuclear reactor generally comprises three or four loops, in each of which the supply water is evaporated at the level of a steam generator by the primary water heated by the reactor core.

A device for shutting down the reactor cold and keeping it shut down, which is located within the enclosure, is branched off from the primary circuit. This device comprises a pump 8 and a heat exchanger 9 making it possible to cool the primary water conveyed into the cooling circuit by opening valves 10.

A safety injection circuit 12 is located partially outside the enclosure and comprises pumps, such as 14, for injecting water from the tank of the swimming pools 15 or water recovered from the sump 16 of the reactor enclosure into the primary circuit in the event of a lack of water in this circuit.

An assembly 20 making it possible to check the chemical composition and volume of the water in the primary circuit is likewise located outside the safety enclosure in the building for the auxiliary nuclear equipment. In particular, an assembly 23 makes it possible to regulate the content of boric acid in the water of the primary circuit, which is involved in checking the reactivity of the reactor.

The control room of the power station makes it possible to control the reactor and monitor the various devices and circuits constituting this power station.

Figure 2:
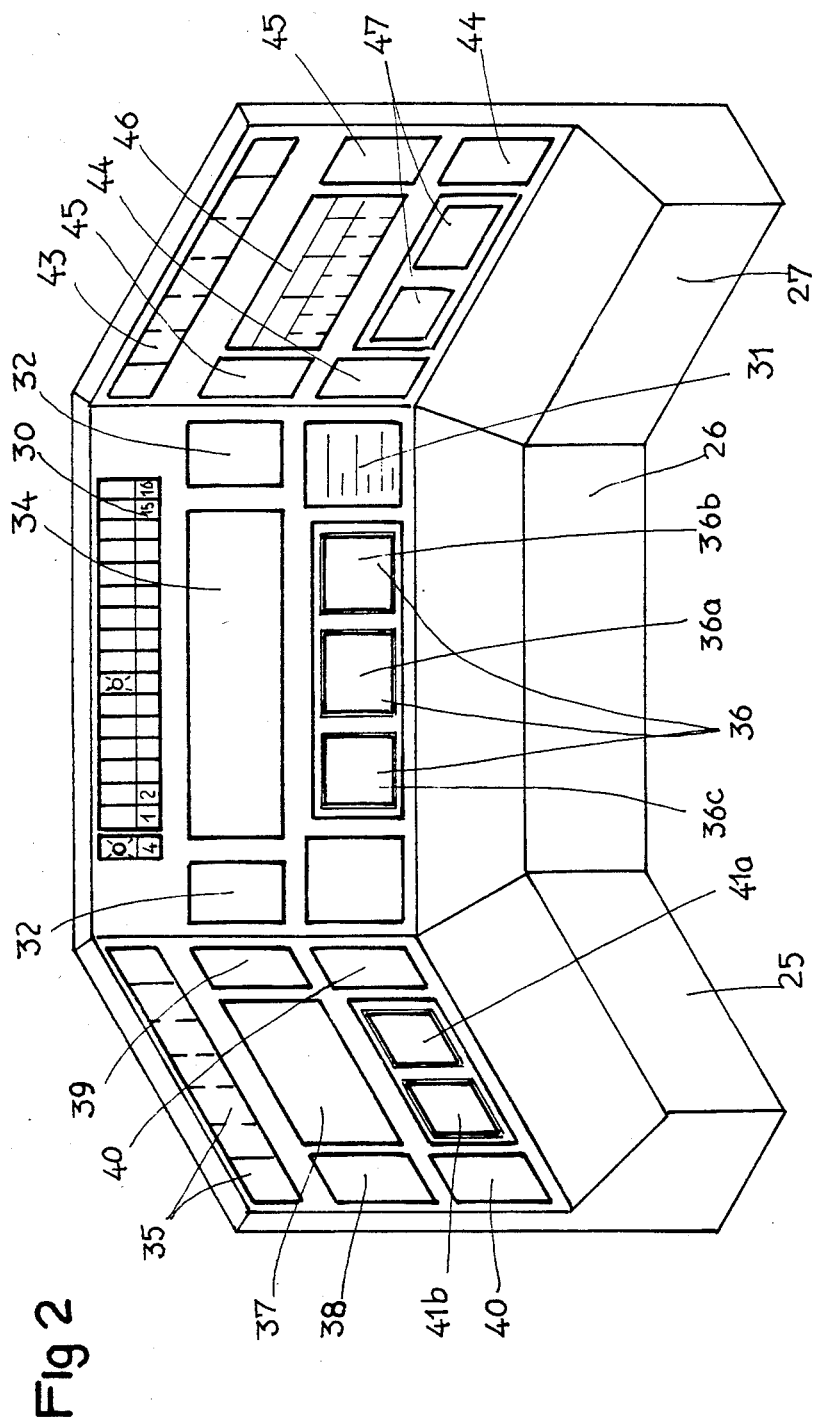
FIG. 2 shows the desk located in the control room, enabling the power station to be monitored.

A control and monitoring desk, as illustrated in FIG. 2, is arranged in the control room of the power station.

Such an assembly makes it possible, in particular, to monitor the various devices and systems which ensure the operation of the reactor and of the entire power station as well as the safety of the entire installation, especially the nuclear part of the power station.

As may be seen in FIG. 2, the control and monitoring desk consists of three separate parts 25, 26 and 27. Each of the parts 25, 26 and 27 carries in its lower portion a control panel from which the operator can act on the elements of the power station, and in its upper portion display means allowing the operations in progress to be monitored and verified.

The central part 26 constitutes the general operating zone of the control station and contains the most important means for monitoring the power station. In particular, this general operating zone possesses a display panel 30, illustrated in detail in FIG. 3, making it possible to represent visually, in a very clear way, by means of indicator lights, the state of the various functions being monitored and the general state of the situation of the reactor.

This zone 26 also contains a panel 31, shown in detail in FIG. 5, which makes it possible to represent visually the state and variation of the main parameters which the operator needs to ascertain for the situation of the power station.

Recorders 32 make it possible to ascertain the history of the main parameters.

A general circuit diagram 34 enables the state of the main actuating elements of the power station (such as valves and pumps) to be represented visually.

Finally, screens 36 permit the display either automatically or at the operator's request of special information such as a list of the parameters resulting in a modification of the state of the situation or the functions of the power station.

FIG. 4 shows an image displayed automatically on the screen 36b in the event that the function 31 "check of primary pressure" has undergone a change of state.

The zone 25 of the control desk or analysis zone comprises an assembly of alarms 35, relating to components of the safety systems of the reactor. A block diagram 37 makes it possible to display the state of the functions for protecting and safeguarding the reactor.

A panel 38 makes it possible to represent visually the state and variation of the main safety parameters of the reactor. A panel 39 makes it possible to display the state of availability of the various safeguard systems of the reactor and a panel 40 makes it possible to display the state of the various margins in relation to the threshold of emergency shutdown or of safety injection in the nuclear reactor. A screen 41a makes it possible to forecast the effect which a change in the situation of the reactor would have on the state of the parameters, functions and situation, retaining the information relating to the parameters from the moment when the forecast is made. A screen 41b makes it possible to obtain automatically, during a change in the situation, information relating to the main parameters in the situation prior to the change.

The part 27 of the control desk or equipment operating zone comprises an assembly of alarms 43 corresponding to each of the elements or equipment of the power station which are being monitored, panels 44 displaying the state and tendency of the main parameters linked to important items of equipment, such as, for example, the turbine and the primary pumps, panels 45 making it possible to display the history of these parameters linked to important items of equipment, and a block diagram 46 making it possible to display the state of the items of equipment grouped in sub-assemblies, such as the primary circuit or circuit for monitoring the chemical composition and volume of the primary fluid.

Finally, two screens 47 make it possible to display automatically or at the operator's request information on the defects exhibited by the items of equipment and, in particular, by the items of equipment subject to an alarm indicated by one of the indicator lights 43 of the equipment operating zone.

FIG. 3 shows in detail the panel 30 making it possible to display the situation of the reactor in the space 50 according to coding indicated in the space 49. The six situations itemized are as follows:

1. the reactor operates at a certain power exceeding 10% of the nominal power,
2. the reactor operates at a power between a very low power and 10% of the nominal power,
3. the reactor is shut down and is on stand-by hot,
4. installation during a period of starting and shutdown,
5. emergency shutdown of the reactor,
6. safety injection into the primary circuit of the reactor.

The numeral 5 displayed in the space 50 indicates that the reactor has undergone an emergency shutdown because all the control bars have dropped into the position of maximum insertion in the core.

The spaces 51 indicate the various states adopted to characterize the various functions mentioned in the spaces 52.

Five different states have been adopted: two normal states N1 and N2, two defective states D1 and D2 and one abnormal state A.

Sixteen functions have been itemized, each of these functions grouping a certain number of parameters expressing the state of the equipment or the value of the physical quantities which need to be monitored so as to make sure that it is possible to put the function into effect.

The various functions adopted are indicated in the table below, the numbers of these functions reappearing in the spaces 52 on the panel shown in FIG. 3.

| Number of the function | Description of the function |
| --- | --- |
| 1 | control of reactivity and flux |
| 3 | cooling of the core |
| 3.2 | control of primary temperature |
| 5 | soundness of the primary circuit |
| 7 | control of the ambient conditions in the enclosure |
| 9 | generation and elimination of electrical energy |
| 11 | provision of supply water |
| 13 | processing and control of radioactive waste |
| 15 | availability of the safeguard circuits |
| 2 | inventory of water |
| 3.1 | check of primary pressure |
| 4 | elimination of primary energy |
| 6 | soundness of the enclosure |
| 8 | chemistry of the water |
| 10 | vaccuum in the condenser |
| 12 | purges and reheating of the secondary circuit |
| 14 | operational state of the general auxiliary equipment |
| 16 | administrative regulations |

The indicator lights 53 make it possible to indicate to the operator in a very simple way the state of each of the functions according to the coding adopted.

Logic elements make it possible to determine the state of the function from the state of the various parameters as being the most unfavorable state recorded for any one of the parameters.

For example, in FIG. 3, the state D1 has been allocated to the function 3.1, check of primary pressure, at least one of the parameters of this function having a state D1 in the situation 5, that is to say emergency shutdown of the reactor, and no parameter of this function 3.1 having a more unfavorable state.

If no other function has a more unfavorable state than D1, a state D1 is allocated to the situation 5, emergency shutdown of the reactor, and this state is that of the function having the most unfavorable state, appearing in the space 54.

The panel, as illustrated in FIG. 3, allows the operator to have a very rapid view of the overall state of the situation of the reactor and of the state of each of the functions itemized.

Taking as an example the function 3.1, check of the pressure of the primary circuit, one of the main parameters of the function is the physical parameter "pressure in the primary circuit", and the state of this parameter will be determined by comparing the value of the pressure measured by the sensors with threshold values determined as a function of the current specifications relating to this primary pressure.

Thus, a normal state of the parameter in the situation 1 will be recorded if this pressure is between 151 and 160 bars. These two threshold values correspond to the level of the alarms in the current monitoring systems.

A deteriorated state of the parameter will be recorded if the pressure is between 130 and 151 bars or between 160 and 164 bars. These two limiting values correspond to the thresholds of emergency shutdown of the reactor.

Finally, if the pressure is below 130 bars or above 164 bars, an abnormal state of the parameter will be recorded.

Having started from the situation 1 corresponding to the reactor operating at power, we end at the situation 5, namely the situation corresponding to the reactor after an emergency shutdown. In this new situation the threshold values for the pressure will be different.

It will thus be seen that the system of monitoring solely by alarms is replaced by a monitoring system with an indication of the state of deterioration of the function and situation of the reactor.

Over and above the main physical parameter, in the case of the function of checking the pressure of the primary circuit, it is necessary to determine the state of all the parameters describing the availability of the systems contributing to carrying out this function.

These systems relate for example, to regulating the primary pressure in the pressurizer, and in this case the parameters to be considered relate to the state of the heating elements of the pressurizer and the sprinkling system.

All the elements contributing to determining the state of availability of these systems are taken into account in determining the state of the function.

It should be noted that the state of the various parameters can be allocated differently depending on the situation of the reactor. For example, as regards the function of checking the primary pressure, in the event that the reactor operates at power, if two discharge lines of the pressurizer are unavailable, an abnormal situation must be declared. On the other hand, in the situation after an emergency shutdown (5), the fact that two discharge lines of the pressurizer are unavailable does not thereby bring about an abnormal situation, but simply a deteriorated situation.

This results from a close analysis of the technical specifications relating to the operating of the power station in terms of logic, enabling the state of the functions resulting from the state of the parameters to be displayed.

FIG. 4 shows the image which appears automatically on the screen 36b in the event that the function 3.1 "check of primary pressure" undergoes a change of state. The parameters of the function appear in the first column under the heading "designations", and their state appears in the form of luminous signals in the rectangular zones illustrated in FIG. 4 by dashed lines. Assuming that the function "check of primary pressure" passes into a state D1, as shown in FIG. 3, the corresponding indicator light 53 on the display device 30 begins to flash and then the image shown in FIG. 4 appears on the screen 36b. The signal lamp 53 remains lighted, but stops flashing.

A flashing luminous signal appears opposite the parameter responsible for the change of state of the function, in the column D1. The operator is thus warned that the change of state of the function is attributable to this parameter.

If a second parameter passes into a state D1, a flashing luminous signal appears opposite this parameter in the column D1, while the luminous signal of the first parameter stops flashing.

The state of the various parameters is indicated in the image appearing on the screen 36b and illustrated in FIG. 4 by means of a fixed luminous signal in a corresponding column.

The operator can display on the screen 36a, as required, the information relating to the parameters of other functions.

The screens 36 thus permit a closer analysis of the causes of a change of state in a situation or in a function.

FIG. 5 shows part of the panel 31 making it possible to display the state and tendency (increase or reduction) of the main parameters.

The two main parameters illustrated in FIG. 4 are the pressure of the primary circuit and the water level in the pressurizer, but there are other parameters representing the other functions.

An indicator light makes it possible to indicate the tendency of the physical parameter (in both cases, the tendency is towards an increase) and the numerical value of the parameter and its range over a scale the extreme values of which are indicated. These ranges are adjusted in keeping with the value of the parameter of the situation in question.

A very clear and very rapid view of the parameters to be monitored is given to the operator in this way.

The various parameters or systems envisaged for determining the state of the function give rise, on the other hand, to displays on the specialized panels described in relation to FIG. 2.

One of the main advantages of the invention lies in a very rapid and highly synthetic visual representation of the state of the reactor in the situation in question and of the state of each of the functions which is to be ascertained.

It is obvious that the invention is not limited to the embodiment which has been described. Thus, it is possible to conceive of the use and definition of functions different from those which have been listed, and it is possible to envisage displays other than those described and states different from those listed, provided that the indication of these states to the operator allows him to have a precise view of the situation of the reactor and of the various functions, enabling him to reach a decision very quickly regarding the operating of the reactor.

Finally, the method according to the invention can be used not only in an electricity generating station equipped with a pressurized-water nuclear reactor, but also in any electricity generating station equipped with a nuclear reactor of any type.

Monitoring can be limited to the actual nuclear elements of the power station or can, on the contrary, extend to all the non-nuclear elements such as the turbine using the steam generated by the nuclear reactor.

I claim:

1. Method of monitoring an electricity generating station equipped with a nuclear reactor, involving gathering quantitative or qualitative information, called "parameters", that can be defined, each time, by a unique numerical information, relating to the operation and to the state of the components of the power station, comparing these parameters with reference data corresponding to normal operation, and signalling the differences existing between the parameters and the reference data, the state of the reactor being defined at each moment by one situation selected from an assembly of predetermined situations corresponding to the various phases of operation or shutdown of the reactor, depending on the level of the power emitted by the core, the physical parameters of the primary fluid and their variation with time or the needs for action relating to the protection or safeguard of the reactor, wherein (a) the type of operation of the reactor is defined at each moment by linking it to one of the predetermined situations;

(b) the useful parameters for monitoring the power station are grouped into sub-assemblies called "functions", each corresponding to the assembly of the parameters to be monitored when monitoring the performance of a particular and indispensable task in a power station for normal control or for performing an emergency action;

(c) the qualitative state of each of the parameters of each of the functions involved is determined according to a predetermined category describing its suitability for contributing to performing the function in the situation in question and representing a level of deterioration in relation to normal operation according to predetermined specifications;

(d) the most unfavorable state allocated to at least one of the parameters of each of the functions in question is allocated to this function;

(e) the overall qualitative state of the situation is determined as being the most unfavorable qualitative state allocated to at least one of the functions; and (f) the information relating to the overall qualitative state of the situation, to the qualitative state state of each of the functions and to any change of qualitative state in any one of these functions is displayed.

2. Monitoring method according to claim 1, wherein the information relating to certain parameters particularly representative of the functions, in the situation in question, is displayed.

3. Method of monitoring a power station according to claim 1, wherein the information relating to the state of the items of equipment necessary for performing the functions and for putting into effect the safety and safeguard systems of the reactor is displayed.

4. Method of monitoring a power station according to claim 1, wherein the information relating to the availability of the safety and safeguard systems of the reactor is displayed.

* * * * *